(12) United States Patent
Bux et al.

(10) Patent No.: US 9,075,712 B2
(45) Date of Patent: Jul. 7, 2015

(54) SCHEDULING REQUESTS IN A SOLID STATE MEMORY DEVICE

(71) Applicant: International Business Machines Corporation, Armonk, NY (US)

(72) Inventors: Werner Bux, Zurich (CH); Robert Haas, Zurich (CH); Xiao-Yu Hu, Zurich (CH); Ilias Iliadis, Zurich (CH); Roman Pletka, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 301 days.

(21) Appl. No.: 13/688,270

(22) Filed: Nov. 29, 2012

(65) Prior Publication Data

US 2013/0138912 A1    May 30, 2013

(30) Foreign Application Priority Data

Nov. 30, 2011    (EP) .................................. 11191378

(51) Int. Cl.
- *G06F 12/06* (2006.01)
- *G06F 3/06* (2006.01)
- *G06F 12/02* (2006.01)

(52) U.S. Cl.
CPC ........ *G06F 12/0646* (2013.01); *G06F 12/0253* (2013.01); *G06F 12/0246* (2013.01); *G06F 2212/7205* (2013.01); *G06F 3/061* (2013.01); *G06F 3/0652* (2013.01); *G06F 3/0659* (2013.01); *G06F 3/0679* (2013.01)

(58) Field of Classification Search
CPC ............ G06F 12/0246; G06F 12/0253; G06F 2212/7205
USPC .................................................. 711/103, 165
See application file for complete search history.

(56) References Cited

U.S. PATENT DOCUMENTS

| | | | | |
|---|---|---|---|---|
| 2009/0006719 | A1* | 1/2009 | Traister | 711/103 |
| 2011/0283049 | A1* | 11/2011 | Kang et al. | 711/103 |
| 2012/0191937 | A1* | 7/2012 | Feldman et al. | 711/170 |
| 2012/0278530 | A1* | 11/2012 | Ebsen | 711/103 |

OTHER PUBLICATIONS

Tanenbaum, Andrew, Structured Computer Organization, 1984, Prentice Hall Inc.*

(Continued)

*Primary Examiner* — Ryan Bertram
(74) *Attorney, Agent, or Firm* — Tutunjian & Bitetto, P.C.; Jeff Tang

(57) ABSTRACT

An apparatus and method for a memory controller for managing scheduling requests in a solid state memory device. The memory includes a set of units wherein a unit within the set of units is erasable as a whole by a unit reclaiming process resulting in a free unit available for writing data to. The memory controller further includes a first queue for queuing user requests for reading and/or writing data from/to the memory, and a second queue for queuing unit reclaiming requests for executing the unit reclaiming process. A scheduler is provided for selecting user requests from the first queue and unit reclaiming requests from the second queue for execution according to a defined ratio. The defined ratio is a variable ratio, is dependent on the current number of free units, and permits the memory controller to select requests from both the first queue and the second queue.

19 Claims, 4 Drawing Sheets

(56) References Cited

OTHER PUBLICATIONS

L.P. Chang et. al., "Real-Time Garbage Collection for Flash-Memory Storage Systems of Real-Time Embedded Systems", IEEE Trans. Embed. Comput. Syst. 2004 V 3 N. 4 p. 837-863.

Yoon Jae Seong et. al. "Hydra: A Block-Mapped Parallel Flash Memory Solid-State Disk Architecture", IEEE Transactions on Computers, Jul. 2010, vol. 59, No. 7.

Youngjae Kim et. al., "Harmonia: A Globally Coord. Garbage Collector For Arrays of SSDs," Mass Storage Systems & Tech. (MSST), May 2011 IEEE 27th Symposium pp. 11-12, 23-27.

Junghee Lee et. al., "A Semi-Peemptive Garbage Collector For SSDs," Performance Anal. of Sys. and Software (ISPASS), Apr. 2011 IEEE International Symposium, p. 12-21, 10-12.

\* cited by examiner

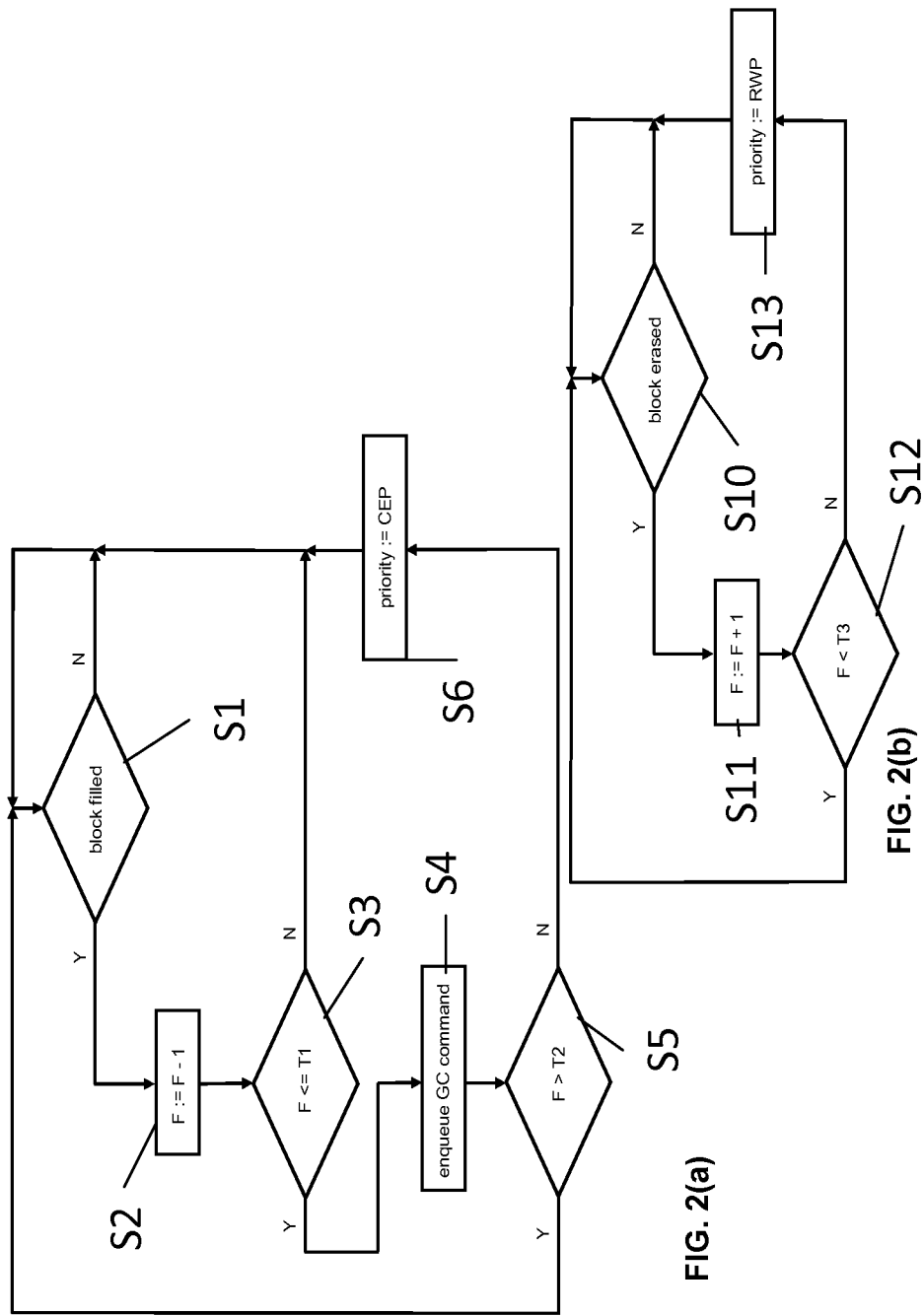

SCHEDULING REQUESTS IN A SOLID STATE MEMORY DEVICE

CROSS-REFERENCE TO RELATED APPLICATION

This application claims priority under 35 U.S.C. §119 from European Patent Application No. 11191378.6 filed Nov. 30, 2011, the entire contents of which are incorporated herein by reference.

BACKGROUND OF THE INVENTION

1. Field of the Invention

More particularly, the present invention is related to scheduling requests in a solid state memory device.

2. Description of the Related Art

Solid state memory devices encompass rewritable non-volatile memory devices which can use electronic circuitry for storing data. Currently, solid state memory devices replace conventional storage devices such as hard disk drives and optical disk drives in some arenas, such as in mass storage applications for laptops or desktops. Solid state memory devices are also investigated for replacing conventional storage devices in other areas such as in enterprise storage systems. This is because solid state memory devices offer exceptional bandwidth as well as excellent random I/O (input/output) performance along with appreciated robustness due to lack of moveable parts.

Writing data to a solid-state memory device, such as a flash memory device, requires paying attention to specifics in the flash technology: NAND flash memory is organized in pages and blocks. Multiple pages form a block. While read and write operations can be applied to pages as the smallest entity of such operation, erase operations can only be applied to entire blocks. While in other storage technologies outdated data can simply be overwritten by up-to-date data, flash technology requires an erase operation before up-to-date data can be written to an erased block.

For the reason that flash technology erase operations can take much longer than read or write operations a writing technique called "write out of place" is applied in which new or updated data is written to some free page offered by a free page allocator instead of writing it to the same page where the outdated data resides. The page containing the outdated data is marked as invalid page.

The more data that is written over time, the less free pages can be offered and new blocks can be needed to be reclaimed for a free block queue. For example queue for providing free, i.e. erased blocks for writing new, or updated data to. New free blocks need to be reclaimed from blocks filled with valid and/or invalid data. The block reclaiming process—also known in literature as "garbage collection process"—first identifies blocks for cleaning based on a given policy. Then valid data still residing in these blocks is copied (relocated) to other blocks, and finally the blocks that are now free from valid data are erased and become available again for rewriting. Consequently, the block reclaiming process introduces additional read and write operations, the extent of which depends on the specific policy deployed as well as on system parameters.

In order to free up storage space that is occupied by invalid data there is a requirement to regularly perform block reclaiming. Since the block reclaiming process includes the relocation of valid pages from a reclaimed block to a free block and ensures the erasing of the reclaimed block, both of which tasks include copying and erasing operations representing write operations on the flash die, these operations compete with "regular" user read and write requests for access to the same storage resources, i.e., the flash dies. Scheduling is critical for the two classes of requests for accessing the dies that includes user perceived performance and proper execution of the block reclaiming process.

"A Semi-Preemptive Garbage Collector for Solid State Drives", by Junghee Lee et al. in Performance Analysis of Systems and Software (ISPASS), 2011 IEEE International Symposium, 10-12 Apr. 2011 describes a semi-preemptive garbage collection that can preempt on-going garbage collection processing and service pending I/O requests in the queue. Flash performance is enhanced by pipelining internal garbage collection operations and merges them with pending I/O requests when possible.

SUMMARY OF THE INVENTION

According to first aspect of the present invention, a memory controller is provided for managing a memory. The memory controller includes: a first queue for queuing user requests wherein queuing the user requests includes either reading data, writing data or reading and writing data from or to the memory; a second queue for queuing unit reclaiming requests for executing a unit reclaiming process; a scheduler for selecting the user requests from the first queue and the unit reclaiming requests from the second queue for execution according to a defined ratio.

Another aspect of the present invention, a memory controller is provided for managing a memory. The memory controller includes: a first queue for queuing user requests which includes either reading data, writing data or reading and writing data from or to the memory; a second queue for queuing the unit reclaiming requests for executing the unit reclaiming process; and a scheduler for selecting the user requests from the first queue and the unit reclaiming requests from the second queue for execution. The scheduler is adapted to prefer selecting the user requests from the first queue over selecting the unit reclaiming requests from the second queue if a current number of free units is equal to or above a first threshold. The scheduler is further adapted to prefer selecting the unit reclaiming requests from the second queue over selecting the user requests from the first queue if the current number of free units is equal to or less than a second threshold. The scheduler is still further adapted to prefer selecting the user requests from the first queue over selecting the unit reclaiming requests from the second queue after having preferred selecting unit reclaiming requests from the second queue over selecting user requests from the first queue and if the current number of free units is equal to or above a third threshold. The third threshold is equal to or less than the first threshold, and the second threshold is less than the third threshold.

Another aspect of the present invention, a method is provided for managing a memory. The method includes selecting user requests from a first queue and unit reclaiming requests from a second queue for execution according to a defined ration. The first queue is for queuing the user requests which includes either reading data, writing data or reading and writing data from or to the memory. The second queue is for queuing the unit reclaiming requests for executing the unit reclaiming process. The defined ratio is a variable ratio, is dependent on the current number of free units, and permits selecting requests from both the first queue and the second queue.

Another aspect of the present invention a method is provided for managing a memory. The method includes selecting user requests from a first queue is preferred over selecting unit reclaiming requests from a second queue if a current number of free units is equal to or above a first threshold. The first queue is for queuing the user requests which includes either reading data, writing data or reading and writing data from or to the memory. The second queue is for queuing the unit reclaiming requests for executing the unit reclaiming process. The method further includes selecting the unit reclaiming requests from the second queue is preferred over selecting the user requests from the first queue if the current number of free units is equal to or less than a second threshold. The method further includes selecting the user requests from the first queue is preferred over selecting the unit reclaiming requests from the second queue after the scheduler having preferred selecting unit reclaiming requests from the second queue over selecting the user requests from the first queue if the current number of free units is equal to or above a third threshold. The third threshold is equal to or less than the first threshold, and the second threshold is less than the third threshold.

It is understood that method steps may be executed in a different order than listed in a method claim. Such different order shall also be included in the scope of such claim as is the order of steps as presently listed.

Embodiments described in relation to the aspect of an apparatus shall also be considered as embodiments disclosed in connection with any of the other categories such as the method, the computer program product, etc., and vice versa.

BRIEF DESCRIPTION OF THE DRAWINGS

The present invention will be fully appreciated by reference to the following detailed description of preferred but nonetheless illustrative embodiments in accordance with the present invention when taken in conjunction with the accompanying Figures.

FIG. 2 is a scheduling process including two sub-processes in FIG. 2(a) and FIG. 2(b) in form of flow charts according to a further embodiment of the present invention.

DETAILED DESCRIPTION OF PREFERRED EMBODIMENTS

Figure 1:
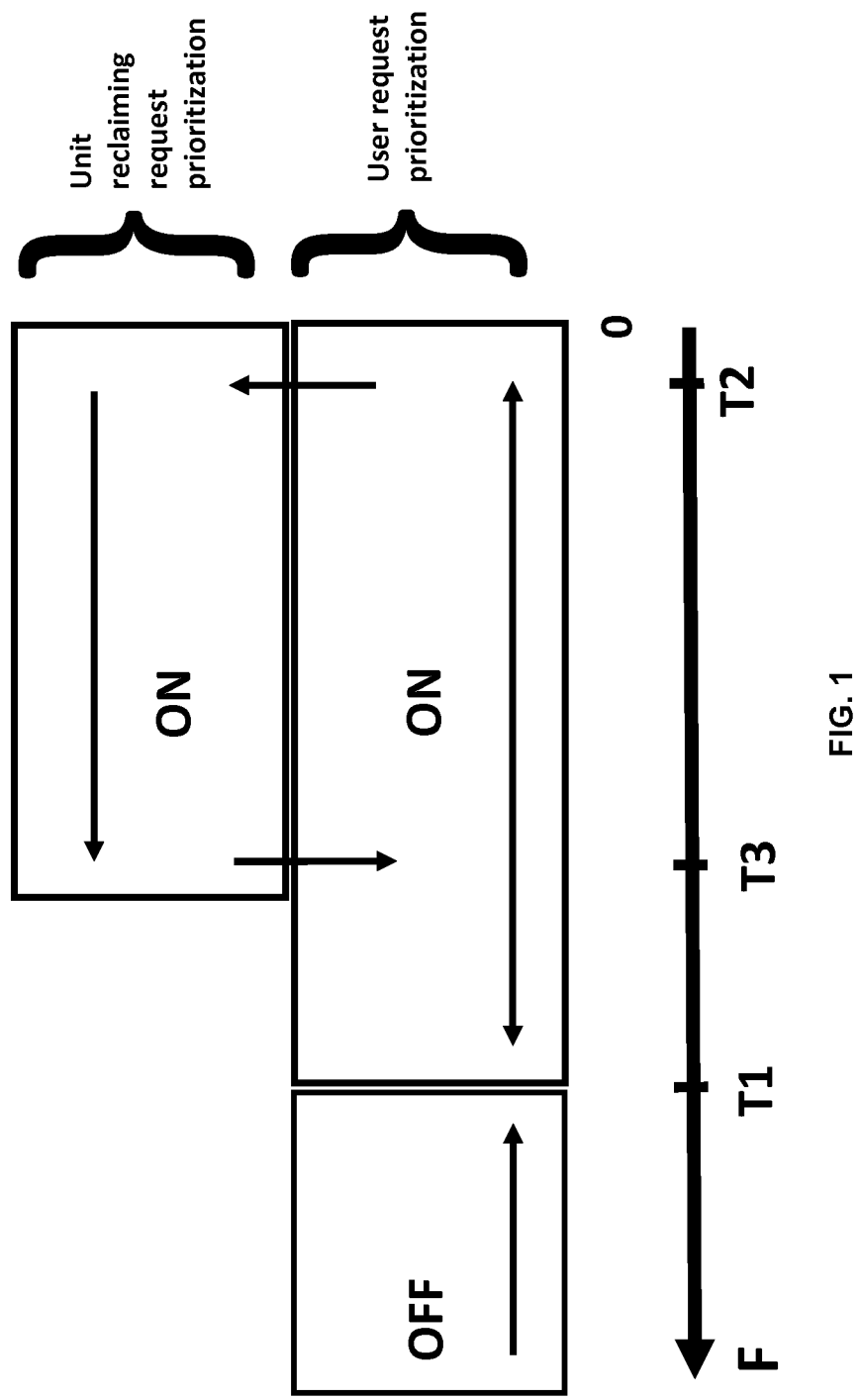
FIG. 1 is a schematic illustrating a concept of a scheduler according to an embodiment of the present invention.

The following description points out the general concept of the invention. This concerns memory controllers as well as methods for managing a computerized memory. The computerized memory is for storing data that includes a set of units for storing data. A unit of the set of units is erasable as a whole by a unit reclaiming process that results in a free unit available for writing data to.

Flash memory represents such a represents memory, and more specifically, represents a solid state memory device, which is a non-volatile solid-state memory technology that can be electrically programmed, erased, and reprogrammed. Its low power consumption and good shock resistance make it very popular for portable devices, such as digital cameras, portable music players, mobile phones, and handheld computers. The computer industry has started to use flash technology in solid-state drives (SSDs) as hard-disk replacements in workstations and enterprise systems. Solid-state drives are built around multiple flash dies which are used to store and retrieve user data. A certain number of dies and a channel controller with a bus interconnecting the flash dies and the channel controller, form a subsystem called flash channel. A SSD can contain several flash channels which operate in parallel. Further building blocks include a central processor, random-access memory, host interface(s), DMA controllers, and a central bus or other interconnect mechanism to provide high-speed connectivity among the various subsystems.

The subject of the present invention is the scheduling of the main request classes in a solid state memory device which a die, a die such as a flash die, is requested to handle. There is a first class of requests representing external user read and write requests, originating, for example, from a host connected to a storage system comprising the solid state memory device. On the other hand, there are read, write, or copy requests generated by the solid state memory device itself in the context of block reclaiming in case of flash memory devices. Generally, in the context of unit reclaiming with a unit typically being the smallest entity to be erased in such solid state memory device. The sequence that these different classes of requests are served can have a distinct impact on the performance observed by the user and simultaneously on the flawless internal operation of the solid state memory device.

A NAND flash memory, is an example of a generic solid state memory device, which is partitioned into units known as blocks, where each block has a fixed number of sub-units also known as pages (typically 64, 128 or 256), and each page is of a fixed size (typically 4 or 8 Kbyte). In typical flash chips, data are written in an entity of one page, and the erase is performed in an entity of one block, and reads are performed in entities of pages. A page can either be programmable or not programmable. A programmable page becomes not programmable once it is written because it either contains valid or invalid data.

In flash-based systems, a writing mechanism called "out-of-place writing" is used. When a page or a fraction thereof needs to be rewritten, the new or update data can not overwrite the memory location where the data is currently stored. Instead, the new data is written on another page and the old page is marked invalid. Over time the SSD accumulates invalid pages and the number of free pages decreases. To make space for new or updated data, invalid pages are preferably reclaimed. The only way to reclaim a page is to erase the entire block the page pertains to. Reclamation, also known as garbage collection, is processed in multiple steps. First, one or more of the blocks is selected for reclamation. Second, valid pages of the blocks are copied and relocated to a free block, which becomes part of the actively used storage space of the device. Third, the reclaimed block is erased, becomes a free block, joins a free-block pool, and thereby becomes available for writing new data to. NAND Flash chips typically support one read, write or erase operation being processed concurrently. Newer chips allow two concurrent operations, but with certain limitations, for example, the operations shall be the same type of operation, restrictions on the exact location in the die, etc. Therefore, many operations can be outstanding on a single channel. However, the controller can only handle operations one by one. Therefore, read, write, and erase operations are typically handled asynchronously.

To achieve high throughput, enough operations can be queued for a single die on one side until the controller reserves that die again, and on the other side completed operations by the hardware can be queued until the controller can have time to pick them up. This is typically implemented using a circular buffer data structure. A circular buffer uses a single fixed-sized buffer for transferring operations from a producer to a consumer. It automatically wraps to the first location in the buffer once the last one has been used. Separate circular buffers can be used to send operations to the hardware and receive completion information back from the hardware. It is important to note that once a producer places an operation in the circular buffer it can no longer be altered.

The present invention operates a scheduler of a memory controller with two different schemes for selecting pending requests from two queues, for example, a first queue for user requests and a second queue for unit reclaiming requests. In the first scheme user read and write requests, labeled RWP for "read/write priority", collectively denoted as user requests are served with a higher non-preemptive priority over unit reclaiming requests. In the second scheme unit reclaiming requests, including copy and ensuing erase operations, called CEP for "copy/erase priority", are served with a higher non-preemptive priority over user requests. It was found that as long as the system is not overloaded applying the first scheme RWP results in distinctly shorter mean user request waiting times than applying the second scheme CEP. Further it was found that unit reclaiming requests under CEP can cause latency spikes, even under light load. Under the first scheme, RWP, the unit reclaiming duration remains small up to rather high utilizations. The unit reclaiming duration increases sharply as the load approaches the system capacity. Excessively long unit reclaiming delays will eventually starve the system of free units.

Based on these observations, the following conclusions can be reached. Due to its consistent short unit reclaiming duration, the second scheme CEP is a robust priority strategy. However, it is deficient relative to user read and write latencies. Provided the system does not run very close to its capacity, the first scheme RWP yields the best user read/write latencies and, in particular, avoids latency spikes. However, a pure application of the first scheme RWP is not a viable priority strategy for SSDs, since under overload, unit reclaiming could last arbitrarily long and potentially result in a deadlock situation where no free pages are available anymore.

The present invention refers to a memory controller and a method that combines a latency optimal scheme such as the first scheme RWP with a mechanism which ensures that, under any workload, unit reclaiming can be performed, i.e., initiated and completed, in synchronization with the consumption of free units. As a result, the present invention yields minimum latencies for user requests while guaranteeing that the system is not starved of free units.

According to first aspect of the present invention, a first queue for queuing user requests for reading and/or writing data from/to the memory is provided as is a second queue for queuing unit reclaiming requests for executing the unit reclaiming process. The scheduler is now implemented such that user requests from the first queue and unit reclaiming requests from the second queue are selected for execution according to a defined ratio. A defined ratio is understood as a ratio between user requests and unit reclaiming requests being served and defines a proportion between the two classes of requests for being served. The defined ratio is a variable ratio which is understood as a ratio that does not need to be constant but can vary in value. The ratio is dependent on the current number of free units. The ratio permits selecting requests from both the first queue and the second queue.

This means that the ratio does not allow for an exclusive selection of user requests without serving any unit reclaiming requests, and does not allow for an exclusive selection of unit reclaiming requests without serving any user requests (scenarios can be described by ratios ranging from zero and infinite). Therefore, more user requests can be served the more free units that are currently available. On the other hand, more unit reclaiming requests can be served the less free units that are currently available.

In contrast to "A Semi-Preemptive Garbage Collector for Solid State Drives", by Junghee Lee et al. in Performance Analysis of Systems and Software (ISPASS), 2011 IEEE International Symposium, 10-12 Apr. 2011 paper, in which the execution of a single user requests can be interrupted by the execution of garbage collection requests, and different states in the scheduling system allow different kind of user requests to be intermingled with the execution of unit reclaiming requests, the scheduling mechanism in the present invention describes a defined ratio between user requests and unit reclaiming requests for execution. In the prior art, there is no such defined ratio because the various scheduling states a ratio that is not predictable and such ratio does not form a basis for scheduling. In contrast, the present invention's scheduling scheme defines a ratio between the different classes of requests to be executed.

Another aspect of the present invention provides a first threshold serving as an initiator for starting a scheduling between user requests and unit reclaiming requests according to the defined ratio. Above the first threshold, there can be sufficient free units available such that no unit reclaiming request needs to be served and no unit reclaiming request needs to be admitted for joining the second queue. New unit reclaiming requests can only be admitted to the second queue in this scheme if the current number of free units is less than the first threshold. The present ratio is a variable and can depend on the number of free units available, where the ratio only permits serving both classes of requests. In the above-mentioned prior art, the scheduling scheme does not follow a defined ratio or a variable ratio, and does not exclude serving of one of the prohibited classes.

Another aspect of the present invention the memory includes a set of units where a unit within the set of units is erasable as a whole by a unit reclaiming process resulting in a free unit available for writing data to.

Another aspect of the present invention the defined ratio is a variable ratio and is dependent on a current number of free units which permits the memory controller to select requests from both the first queue and the second queue.

In another aspect of the present invention, the memory controller may include a scheduler that is adapted to select requests according to the defined ratio if the current number of free units is less than a first threshold;

In another aspect of the present invention the scheduler is adapted to exclusively select user requests from the first queue if the current number of free units is equal to or above the first threshold, In another aspect of the present invention the memory controller is adapted to admit unit reclaiming requests joining the second queue only if the current number of free units is less than the first threshold.

In another aspect of the present invention the scheduler is adapted to define the ratio such that the more free units are currently available the more user requests from the first queue are selected for execution at the expense of selecting block reclaiming requests from the second queue.

Another aspect of the present invention the scheduler is adapted to define the ratio proportional to the current number of free units.

Another aspect of the present invention the scheduler is adapted to define the ratio by defining a first number representing the number of user requests to be selected for execution in a row from the first queue and by defining a second number representing the number of unit reclaiming requests to be selected for execution in a row from the second queue.

In another aspect of the present invention in case the queue out of the first and the second queue the scheduler currently selects requests from for execution becomes an empty queue prior to the scheduler having selected the associate defined number of requests in a row, the scheduler is adapted to continue selecting requests from the other queue without waiting for new requests joining the concerned queue. Furthermore, a microprocessor is adapted to execute requests from the first and the second queue as selected by the scheduler. The microprocessor is adapted to execute the unit reclaiming process, which includes determining a unit out of the set of units for erasure, relocating valid subunits from the determined unit to another unit, and erasing the determined unit.

In another aspect of the present invention the first embodiment of the present invention can be implemented as a method.

In another aspect of the present invention the method can include selecting requests according to the defined ratio if the current number of free units is less than a first threshold. Furthermore, selecting user requests from the first queue is preferred over selecting unit reclaiming requests from the second queue if the current number of free units is above the first threshold, and admitting unit reclaiming requests for queuing in the second queue only if the current number of free units is not more than the first threshold.

The first queue can be implemented as a queue for serving both, read and write requests. In another aspect of the present invention, the first queue can be built from two sub-queues, one of which is reserved for queuing user read requests and the second one is reserved for queuing user write requests. In this embodiment, user read requests can be handled with a higher priority than user write requests as long as the execution order of user read and user write requests from/to the same location are maintained. This helps in reducing read latency.

According to the second aspect of the present invention, the same queues are provided in the memory controller. The scheduler now prefers selecting user requests from the first queue over selecting unit reclaiming requests from the second queue if the current number of free units is equal to or above a first threshold. If the current number of free units less than a second threshold, the scheduler prefers selecting unit reclaiming requests from the second queue over selecting user requests from the first queue. Lastly, if the current number of free units is equal to or above a third threshold, the scheduler prefers selecting user requests from the first queue over selecting unit reclaiming requests from the second queue after having preferred selecting unit reclaiming requests from the second queue over selecting user requests from the first queue. Specifically, the third threshold is equal to or less than the first threshold and the second threshold is less than the third threshold.

For example, preferred selecting/prioritization from/of one queue over the other queue can contain that requests from the non-preferred queue can only be selected/served when the preferred queue is empty.

In this embodiment, the scheduler can switch to kind of an alert state when the number of free units falls below the first threshold. In such a state, the user requests are still preferably treated over the unit reclaiming requests, and, in a further embodiment can still be exclusively selected for execution, however, unit reclaiming request may be admitted to the second queue for joining and for building a pipeline there. Once the number of free units falls below the second threshold, which means that the number of free units is considered to be critical for serving future user requests, the priorities are switched from a user request prioritization to a unit reclaiming request prioritization. In such a state, the unit reclaiming process can no longer be interrupted by executing user requests, or user requests can no longer be served between two unit reclaiming requests. As described in the prior art, switching back to the user request preferring scheme can be due when the number of free units reaches the second threshold again. However, it can be beneficial not to return to the user request preferred scheme at the second threshold yet, but to allow freeing some more units instead. This can result in a return to the user request prioritization when the number of free units is equal to or exceeds a third threshold, where the third threshold is equal to or less than the first threshold but is more than the second threshold. Such scheme prevents a high-frequency toggling of the scheduling around the second threshold.

In another aspect of the present invention the scheduler is adapted to exclusively select user requests from the first queue if the current number of free units is equal to or above the first threshold. The scheduler is adapted to exclusively select unit reclaiming requests from the second queue if the current number of free units is equal to or less than the second threshold. The scheduler is adapted to select user requests exclusively from the first queue after having exclusively selected unit reclaiming requests from the second queue and if the current number of free units is equal to or above the third threshold.

In another aspect of the present invention the second embodiment of the present invention can be implemented in a method.

In another aspect of the present invention the unit reclaiming requests are only admitted for joining the second queue if the current number of free units is less than the first threshold.

In the following description of the figures, same or similar elements are denoted by the same reference signs.

FIG. 1 illustrates an embodiment of a scheduling scheme according to the first embodiment of the present invention. An adaptive scheduling of user and system related, unit reclaiming related read, write, copy, and erase requests is applied, which results in an improved optimizing performance while meeting system requirements for efficient and properly functioning block reclaiming. In the following it shall again be referred to blocks in the context of a flash based system instead of units. The F-axis denotes the number of free blocks F in the system, die or whichever scale is appropriate. The regions referred to by "OFF" denote regions where block reclaiming requests are not selected by the scheduler, for example, block reclaiming requests are not served and garbage collection is OFF. In these regions, user requests can exclusively be served, for example, selected by the scheduler for execution. The regions referred to by "ON" denote regions where block reclaiming requests are selected by the scheduler, for example, block reclaiming requests are served and garbage collection is "ON". In these regions, user requests can either not be served, served with lower priority, or with higher priority than the block reclaiming requests.

Initially, when F>T1 and sufficient free blocks are around—which is a typical scenario when a new die starts operation—, user read and write requests are assigned a higher priority than valid-page copies and block erases. Using a simple counter, the system keeps track of the number of free blocks F. The counter is decreased by 1, when a block has been completely filled, and is increased by 1 after a block has been erased. If the number of free blocks F is equal to or larger than a first threshold T1, no block reclaiming process is performed. If the number of free blocks F changes from >T1 to T1 or <T1, a command for block reclaiming will be issued and the corresponding unit reclaiming requests will be queued in the second queue. Depending on the scheduling scheme used, it will take more or less time until that command is completely processed. For example, the valid pages in a block identified for reclaiming have been copied and the block has been erased. Upon completion of the block reclaiming process including the subsequent updating of the free-blocks counter, the system immediately triggers a new block reclaiming command, if the number of free blocks F is still smaller than T1. Otherwise, no new block reclaiming command is triggered and the system leaves the block reclaiming mode. If the number of free blocks F falls below a second threshold T2 (T2<T1), priorities get reversed, for example, requests for valid-page copies and ensuing erase operations collectively denoted as block reclaiming requests are processed with higher priority than user reads/writes requests also denoted as user requests. The priority reversal forces the block reclaiming process to complete in finite time.

In the following, an additional third threshold T3 located in between thresholds T1 and T2 is introduced and used in the following way. If the number of free blocks has fallen below the second threshold T2 and the system has reversed priorities, it will return to the original setting when the number of free blocks equals the third threshold T3, which could be as small as T2+1. From an implementation point of view, the queues can be realized as circular buffers whereby operations are placed by the memory controller into either a normal or high priority circular buffer. Typically, there can be one transmit pair of circular buffers per die for sending operations from the controller to the Flash channel controller and another pair per die for receiving completion information. The scheme described above requires a mechanism by which the processor can signal to the Flash channel controller when to reverse the priorities. Ideally, this should happen with minimum delay. It is not feasible to piggyback this information onto operations in the circular buffer interface. A possible solution is to use a special register or an interrupt mechanism. The need for such a "side channel" makes it difficult, if not impossible, to straightforwardly use the scheme on existing hardware.

In another aspect of the present invention, a scheduler controls two queues, for example, a first queue for holding user read and write requests and a second queue for holding unit reclaiming requests including valid-page copy requests and block erases. The two queues are served in the following way. Service is alternating between the two queues in such a way that up to a first number of m requests waiting in the first queue are served in one batch. Then a second number of n requests are served from the second queue, etc. If there are less than m requests waiting in the first queue, those are served and afterwards the system immediately starts serving the second queue rather than waiting for additional arrivals in the first queue. Similarly, if there are less than n requests waiting in the second queue, those are served and afterwards the system immediately starts serving the first queue rather than waiting for additional arrivals in the second queue. If one of the queues is empty, the system serves the other queue.

In another aspect of the present invention for executing a scheduling ratio of m/n, the two queues can be served in the following way. Service is alternating between the two queues one by one. For example a single request from the first queue is executed, then a single request from the second queue, again a single request from the first queue, and so on. Thus, servicing the queues is implemented by toggling between the queues until either a first number of requests have been served from the first queue or a second number of requests have been served from the second queue. Then the remaining requests from the other queue can be served.

The parameters m and n determine the guaranteed allocation of the system's bandwidth or processing capacity of the two request classes in the first and the second queue. If, for example, a unit reclaiming operation takes twice as long as executing an average user request—for the sake of simplicity without taking the erase operation into account—, n=1 and m=2 would ensure that the processing capacity is fairly split between the two request classes in the sense that user requests will get 50% of the capacity, if required, and the same holds for the unit reclaiming requests.

While the system is in a mode also serving unit reclaiming requests, for example, when the number of free units F is smaller than the first threshold T1, user requests and unit reclaiming requests are scheduled by the above scheduler whereby the values of the parameters m and n are dynamically adjusted as a function of the number of free units F. In case there are many free units, (i.e., values close to the threshold value T1) relatively large ratios of m/n are appropriate, such as 20 or more. When the number of free units F becomes small and eventually reaches a critical region, m/n will need to be in the lower single-digit range. Values of m/n<1 can only be needed under extreme circumstances. For example, if the number of free units F is very small, and the number of relocated pages per garbage-collected block is continuously higher than half of the total number of sub-units per unit. In general, m/n should preferably decrease (or at least not increase) as the number of free sub-units decreases. The exact shape of the control function mapping the number of free units onto parameters m and n can preferably be chosen depending on system parameters such as read, write, copy, erase times and the so-called "write amplification". The latter is a measure for the overhead induced by the unit reclaiming process, which can be estimated by monitoring the number of relocated pages in the reclaimed units. Note, that preferably if the number of free units becomes less than the first threshold T1, block reclaiming requests get generated and queued in the same fashion as in the first embodiment.

In contrast to the scheduler of the first embodiment of the present invention, the scheduler in the second embodiment of the present invention reacts to variations in the number of free units already long before that number reaches a critical region. By using an appropriate control algorithm, it is possible in the second embodiment to tolerate more delay for the updating of the scheduling parameters m and n. This enables to add the values for m and n into the operation information placed into the circular buffers. The Flash channel controller then extracts this information from a new operation to be processed in the circular buffer and uses it to adapt the scheduling of operations accordingly. When the Flash channel controller uses microcode to fetch new operations from the circular buffers, the second scheme can be implemented in an existing system without any hardware change which represents a certain advantage. Obviously, if feasible and desired, the second embodiment can alternatively be implemented by providing a "side channel" between the processor and the Flash controller.

In both embodiments of the present invention, the user-perceived latencies are reduced while it is ensured that, under any workload, the system is not starving of free blocks. The latter is accomplished if the unit reclaiming process is performed (i.e., initiated and completed) in synchronization with the consumption of free units.

In both embodiments of the present invention, no unit reclaiming process is performed if the number of free units is equal to or above the first threshold T1. In order to save processing and storage resources, the first threshold T1 can preferably be kept as small as possible in comparison to the total number of units in a die which can be on the order of tens of thousands. It is advantageous in both embodiments, if during a temporary high load there is a sufficiently large buffer of free units available to bridge the time until the system catches up with the freeing-up of units. Analysis and simulation suggests that for today's 128 or 256 pages per block, a first threshold value of T1 in the range of 40 to 80 is adequate.

In the first aspect of the present invention, the second threshold T2 can, in principle, be as small as 1, but in order to cope with random delays in the processing of commands, it may be preferred to use a value of 3 to 5.

For the third threshold T3, any value between T2+1 and T1 can be chosen. The larger the value of the third threshold T3 is, the longer the system will remain in the CEP mode during which no user read or write requests are being served. Consequently, a large threshold T3 value will introduce longer service interruptions for the user requests, but at the same time increase the chances that it will take longer until the next such service interruption becomes necessary.

In the second aspect of the present invention, the switching between priorities is preferably implemented in a continuously adapted allocation of the die bandwidth to the two queues. It has the potential to result in a smooth response time under high load. This embodiment reacts to variations in the number of free blocks long before that number gets into the critical region FIG. 2 illustrates a scheduling process in form of flow charts according to another embodiment of the present invention. The scheduling scheme is similar to the embodiment illustrated in FIG. 1. In FIG. 2(a) the process is illustrated starting from verification in step S1 where a block is filled and no longer can be written. In case the block is filled (Y), the number of free blocks F is decreased by one and represents the now current number of free blocks F, referring to step S2. In step S3 it is verified whether the current number of free blocks F is equal to or smaller than a first threshold T1. If not (N) the process returns to the block filling verification step S1. If so (Y), in step S4 a garbage collection (GC) command is triggered and the corresponding unit reclaiming requests are queued in the second queue. In step S5 it is verified whether the current number of free blocks F exceeds a second threshold T2. If so (Y), it is returned to the block filling verification step S1. If not (N), the scheduling mode is set to garbage collection prioritized mode, referring to step S6. Preferably, in the user request prioritized scheduling, requests from the second queue can be served only when the first queue is empty such that the first queue has higher priority than the second queue. Similarly, when referring to a garbage collection prioritized scheduling mode, user requests can be served from the first queue only when the second queue is empty.

In FIG. 2(b) the process is illustrated starting from a verification in step S10 if a block is erased and ready to be written from new. In case the block is erased (Y), the number of free blocks F is increased by one and represents the current number of free blocks F, referring to step S11. In step S12 it is verified whether the current number of free blocks F is less than a third threshold T3. If so (Y), the process returns to the block filling verification step S1. If not (N), in step S13 the scheduling mode is set to the user request prioritized scheduling mode.

Figures 3, 3A, 3B:
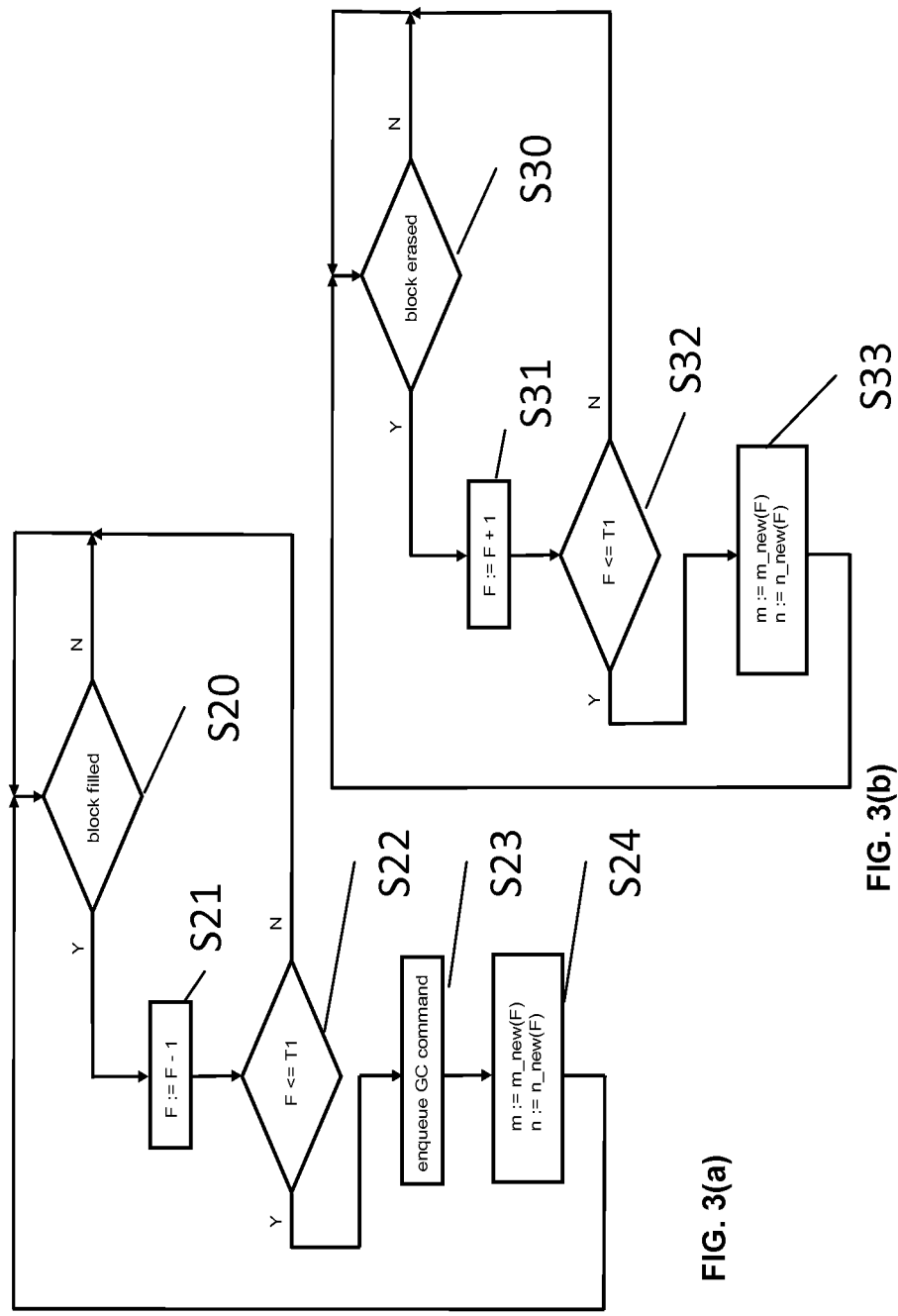
FIG. 3 is a scheduling process including two sub-processes in FIG. 2(a) and FIG. 2(b) in form of flow charts according to a further embodiment of the present invention.

FIG. 3 illustrates a scheduling process in form of flow charts according to another embodiment of the present invention. In FIG. 3(a) the process is illustrated starting from the verification in step S20 to verify whether a block is filled and no longer can be written. In case the block is filled (Y), the number of free block F is decreased by one and represents the current number of free blocks F, referring to step S21. In step S22 it is verified whether the current number of free blocks F is equal to or smaller than a first threshold T1. If not (N), the process returns to the block filling verification step S20. If so (Y), in step S23 a garbage collection (GC) command is triggered and the corresponding unit reclaiming requests are queued in the second queue. In step S24 the number of m user requests to be executed in a row by the scheduler is determined, where number m is subject to the current number of free blocks F. In addition, a number n of unit reclaiming requests to be executed in a row by the scheduler in alternation with the m user requests is determined, where number n is subject to the number of current free blocks F. The scheduler in the following schedules requests from the two queues according to the ratio m/n.

In FIG. 3(b) the process is illustrated for a scheme in which block reclaiming requests, for example, garbage collection requests, are selected for execution by the processor according to the defined ratio m/n. In such scheduling mode it is verified in step S30 whether a block is erased and ready to be written from new. In case the block is erased (Y), the number of free blocks F is increased by one and represents the current number of free blocks F, referring to step S31. In step S32 it is verified whether the current number of free blocks F is less than or equal to the threshold T1. If so (Y) in step S33 the number of m user requests to be executed in a row by the scheduler is determined, where number m is subject to the current number of free blocks F. In addition, a number of n unit reclaiming requests to be executed in a row by the scheduler in alternation with the m user requests are determined, where number n is subject to the current number of free blocks F. The scheduler in the following schedules requests from the two queues according to the ration m/n. If it is determined in step S32 that the current number of free blocks F exceeds the threshold T1, the process returns to verification step S30.

According to another aspect of the present invention, a memory controller for managing a memory includes a memory. The memory includes a set of units wherein a unit within the set of units is erasable as a whole by a unit reclaiming process resulting in a free unit available for writing data to which forms a storage device.

Figure 4:
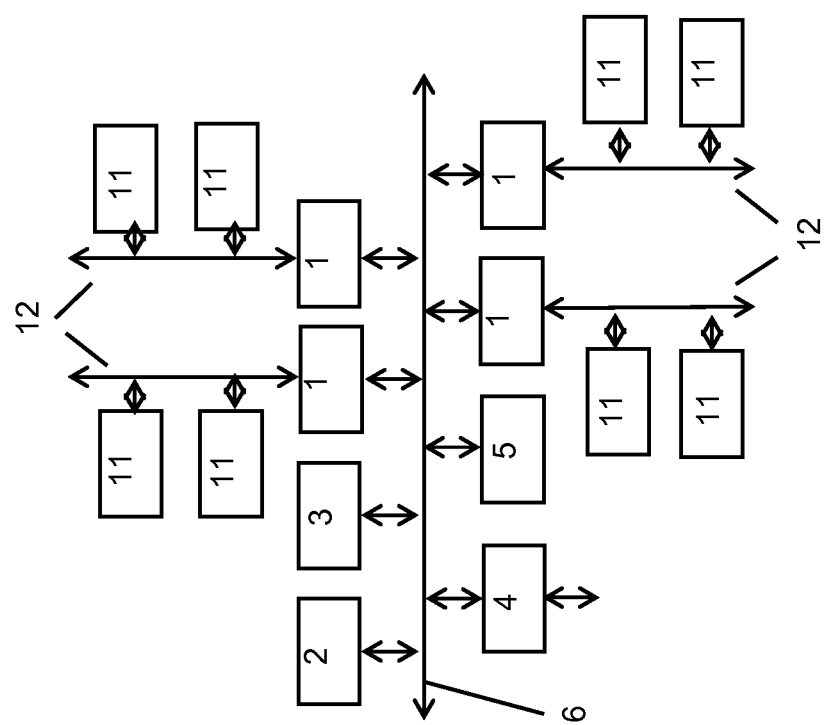
FIG. 4 is a block diagram illustrating a storage device according to a further embodiment of the present invention.

FIG. 4 illustrates a block diagram illustrating a storage device according to a further embodiment of the present invention. The storage device includes multiple flash dies 11 which are used to store and retrieve user data. A certain number of flash dies 11, together with a channel controller 1 and a bus 12 interconnecting the flash dies 11 and the channel controller 1, form a subsystem called flash channel. A storage device in form of a solid state drive (SSD) can contain several flash channels which work in parallel. Further building blocks are a central processor 2, random-access memory 3, host interface(s) 4, DMA controllers 5, and a central bus 6 or other interconnect mechanism to provide high-speed connectivity among the various subsystems.

According to another aspect of the present invention, a computer readable non-transitory article of manufacture tangibly embodying computer readable instructions, which, when executed, cause a computer t carry out the steps of the method according to any one of the above method embodiments of the present invention.

Aspects of the present invention can be embodied as a system, method or computer program product. Accordingly, aspects of the present invention, in particular in form of the controller, can take the form of an entirely hardware embodiment, an entirely software embodiment (including firmware, resident software, micro-code, etc.) or an embodiment combining software and hardware aspects that can all generally be referred to herein as a "circuit," "module" or "system." Aspects of the present invention, such as the read and write methods, can take the form of a computer program product embodied in one or more computer readable medium(s) having computer readable program code embodied thereon.

Any combination of one or more computer readable medium(s) can be utilized. The computer readable medium may be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

In aspects of the present invention computer program code for carrying out operations can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should be noted that in some alternative implementations, the functions noted in the block can occur in a different order than as illustrated in the figures. For example, two blocks shown in succession can, in fact, be executed substantially concurrently, or the blocks can sometimes be executed in the reverse order, depending upon the functionality involved. It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. Memory controller for managing a memory, the memory controller comprising:
    a first queue for queuing user requests which includes either reading data, writing data or reading and writing data from or to the memory;
    a second queue for queuing unit reclaiming requests for executing a unit reclaiming process; and
    a scheduler for selecting the user requests from the first queue and the unit reclaiming requests from the second queue for execution according to a defined ratio,
    wherein the scheduler is adapted to admit the unit reclaiming requests joining the second queue only if the current number of free units is less than the first threshold.

2. The memory controller for managing a memory according to claim 1, wherein the memory comprises a set of units wherein a unit within the set of units is erasable as a whole by the unit reclaiming process resulting in a free unit available for writing data to.

3. The memory controller for managing a memory according to claim 1, wherein the defined ratio is a variable ratio and is dependent on a current number of free units.

4. The memory controller for managing a memory according to claim 3, wherein the variable ratio permits the memory controller to select requests from both the first queue and the second queue.

5. The memory controller for managing a memory according to claim 1, wherein the scheduler is adapted to select requests according to the defined ratio if the current number of free units is less than a first threshold.

6. The memory controller for managing a memory according to claim 1, wherein the scheduler is adapted to exclusively select the user requests from the first queue if the current number of free units is equal to or above the first threshold.

7. The memory controller for managing a memory according to claim 1, wherein the scheduler is adapted to define the ratio so that the more free units that are currently available the more user requests from the first queue are selected for execution.

8. The memory controller for managing a memory according to claim 1, wherein the scheduler is adapted to define the ratio proportional to the current number of free units.

9. The memory controller for managing a memory according to claim 1, wherein the scheduler is adapted to define the ratio by defining a first number (m), wherein (m) represents the number of the user requests to be selected for execution in a row from the first queue, and by defining a second number (n), wherein (n) represents the number of the unit reclaiming requests to be selected for execution in a row from the second queue.

10. The memory controller for managing a memory according to claim 9, wherein if a queue out of the first queue or the second queue which the scheduler currently selects requests from for execution is an empty queue prior to the scheduler selecting the associate defined number of requests in a row, the scheduler is adapted to begin selecting requests from the other queue without waiting for new requests associated with the current queue.

11. The memory controller managing a memory according to claim 9, wherein a microprocessor is adapted to execute requests from the first and the second queue as selected by the scheduler and the microprocessor is adapted to execute the unit reclaiming process comprising the steps of:
   determining a unit out of the set of units for erasure;
   relocating valid subunits of the determined unit from the determined unit to another unit; and
   erasing the determined unit.

12. The memory controller for managing a memory according to claim 1, comprising a memory, wherein the memory comprises a set of units wherein a unit within the set of units is erasable as a whole by the unit reclaiming process resulting in a free unit available for writing data to, which forms a storage device.

13. Memory controller for managing a memory, the memory controller comprising:
   a first queue for queuing user requests which includes either reading data, writing data or reading and writing data from or to the memory;
   a second queue for queuing unit reclaiming requests for executing a unit reclaiming process; and
   a scheduler for selecting the user requests from the first queue and the unit reclaiming requests from the second queue for execution, wherein the scheduler is adapted to:
   select the user requests from the first queue over selecting the unit reclaiming requests from the second queue if a current number of free units is equal to or above a first threshold;
   select the unit reclaiming requests from the second queue over selecting the user requests from the first queue if the current number of free units is equal to or less than a second threshold; and
   select the user requests from the first queue over selecting the unit reclaiming requests from the second queue after having preferred selecting the unit reclaiming requests from the second queue over selecting the user requests from the first queue if the current number of free units is equal to or above a third threshold, wherein the third threshold is equal to or less than the first threshold and the second threshold is less than the third threshold.

14. The memory controller for managing a memory according to claim 13, wherein the scheduler is adapted to:
   select the user requests exclusively from the first queue if the current number of free units is equal to or above the first threshold;
   select the unit reclaiming requests exclusively from the second queue if the current number of free units is equal to or less than the second threshold; and
   select the user requests exclusively from the first queue after exclusively selecting unit reclaiming requests from the second queue if the current number of free units is equal to or above the third threshold.

15. A method for managing a memory, the method comprising the step of:
   selecting user requests from a first queue and unit reclaiming requests from a second queue for execution according to a defined ratio;
   wherein the first queue is for queuing the user requests which includes either reading data, writing data or reading and writing data from or to the memory,
   wherein the second queue is for queuing the unit reclaiming requests for executing a unit reclaiming process,
   wherein the defined ratio is a variable ratio and is dependent on a current number of free units which permits selecting requests from both the first queue and the second queue, and
   wherein the unit reclaiming requests are admitted to join the second queue only if the current number of free units is less than the first threshold.

16. The method for managing a memory according to claim 15, wherein:
   selecting requests according to the defined ratio if the current number of free units is less than a first threshold;
   selecting the user requests from the first queue is preferred over selecting the unit reclaiming requests from the second queue if the current number of free units is equal to or above the first threshold; and
   admitting the unit reclaiming requests for joining the second queue only if the current number of free units is less than the first threshold.

17. A method for managing a memory, the method comprising the steps of:
   selecting user requests from a first queue is preferred over selecting unit reclaiming requests from a second queue if a current number of free units is equal to or above a first threshold;
   wherein the first queue is for queuing the user requests which includes either reading data, writing data or reading and writing data from or to the memory and wherein the second queue is for queuing the unit reclaiming requests for executing a unit reclaiming process;

selecting the unit reclaiming requests from the second queue is preferred over selecting the user requests from the first queue if the current number of free units is less than a second threshold; and selecting the user requests from the first queue is preferred over selecting the unit reclaiming requests from the second queue after the scheduler has preferred selecting the unit reclaiming requests from the second queue over selecting the user requests from the first queue if the current number of free units is equal to or above a third threshold, wherein the third threshold is equal to or less than the first threshold and the second threshold is less than the third threshold.

18. The method for managing a memory according to claim 17, wherein unit reclaiming requests are admitted for joining the second queue only if the current number of free units is less than the first threshold.

19. A computer readable non-transitory article of manufacture tangibly embodying computer readable instructions, which, when executed, cause a computer to carry out the steps of a method according to claim 15.

\* \* \* \* \*